United States Patent
Ramsay (10) Patent No.: US 8,641,127 B2
(45) Date of Patent: Feb. 4, 2014

(54) PLASMA SPOILER

(75) Inventor: Thomas Ramsay, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1005 days.

(21) Appl. No.: 12/237,956

(22) Filed: Sep. 25, 2008

(65) Prior Publication Data

US 2010/0072778 A1     Mar. 25, 2010

(51) Int. Cl.
    *B62D 35/00*      (2006.01)

(52) U.S. Cl.
    USPC ..................................... 296/180.5; 296/180.1

(58) Field of Classification Search
    USPC ............................................ 296/180.1–180.5
    See application file for complete search history.

(56) References Cited

U.S. PATENT DOCUMENTS

| | | | |
|---|---|---|---|
| 4,810,022 A * | 3/1989 | Takagi et al. | 296/180.5 |
| 6,200,539 B1 | 3/2001 | Sherman et al. | |
| 6,575,522 B2 | 6/2003 | Borghi et al. | |
| 7,066,431 B2 | 6/2006 | Scott et al. | |
| 7,322,638 B2 | 1/2008 | Larson | |
| 7,380,756 B1 * | 6/2008 | Enloe et al. | 244/175 |
| 7,624,941 B1 * | 12/2009 | Patel et al. | 244/3.22 |
| 2008/0122252 A1 * | 5/2008 | Corke et al. | 296/180.2 |

OTHER PUBLICATIONS

Separation Control on High Angle of Attack Airfoil Using Plasma Actuators, AIAA Journal, vol. 42, No. 11, Nov. 2004, pp. 2177-2184.*

* cited by examiner

*Primary Examiner* — Dennis Pedder (74) *Attorney, Agent, or Firm* — Mark E. Duell; Rankin, Hill & Clark LLP (57) ABSTRACT

A plasma spoiler is mounted in a rear portion of a vehicle for exerting a force on a passing air flow. The plasma spoiler has a dielectric substrate formed of a dielectric material, a first electrode mounted on a bottom surface of the dielectric substrate and insulated by the dielectric substrate, a second electrode mounted on an upper, exposed surface of the dielectric substrate, and a power source connected to the first and second electrodes. The first electrode is disposed in a rearward direction relative to the second electrode. A switch is disposed between the power source and one of the first electrode and the second electrode. The switch is controlled by a controller that is in communication with a speed sensor, so as to activate the plasma spoiler only when the vehicle exceeds a trigger speed.

24 Claims, 7 Drawing Sheets

PLASMA SPOILER

BACKGROUND OF THE INVENTION

To improve upon the aerodynamic performance of high performance vehicles, the vehicles are designed with streamlined, aerodynamic shapes. The streamlined shape of high performance vehicles generally improves aerodynamic performance by reducing the effect of drag on the vehicle. However, at high speeds, the streamlined shape can result in stability control problems. Specifically, an increased lift force acting on the vehicle causes the vehicle to rise up on the vehicle's suspension. This imparts a sluggish feel to the operator by reducing the response of the vehicle to driver inputs.

The lift force is caused by the increased velocity of the airstream passing over the top of the vehicle than the airstream passing below the vehicle. This effect is enhanced on a vehicle having a tapered tail end, as is the case with streamlined, high performance vehicles. Additionally, as the vehicle travels at high speeds, a lift force acting on the vehicle increases. The increase in lift force results in the vehicle rising on its suspension, with the negative consequences listed above following.

To counteract the negative effects of excessive lift force, high performance vehicles are equipped with spoilers. Spoilers deflect the airstream flowing over the top of the vehicle, disrupting the lift producing flow field as well as potentially increasing the down force by directing the flow field upward.

Figure 1A:
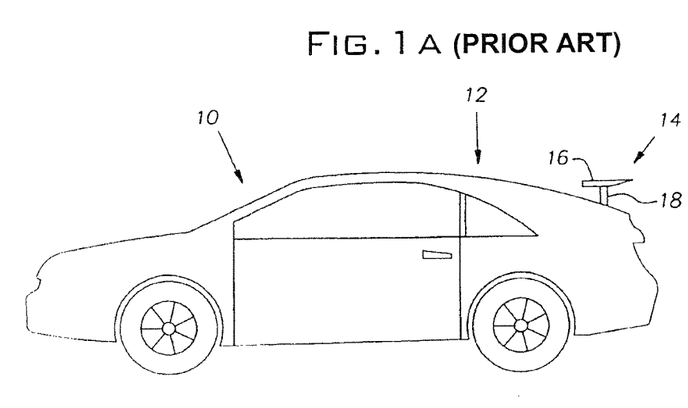
FIG. 1A illustrates a side view of a fixed spoiler of the prior art.
Figure 1B:
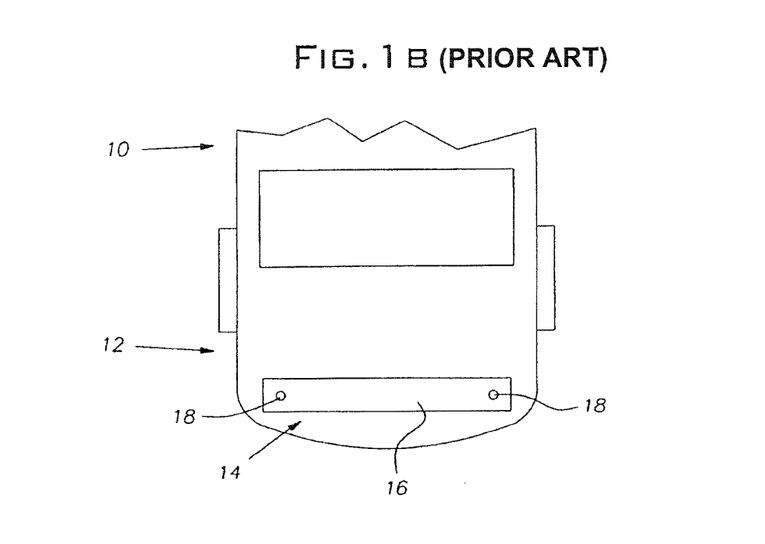
FIG. 1B illustrates a top view of the fixed spoiler of the prior art.

A conventional, fixed spoiler is shown in FIGS. 1A and 1B. A high performance vehicle 10 has a fixed spoiler 14 mounted on a rear end 12 thereof. The fixed spoiler 14 includes an airfoil 16 and two legs 18. The airfoil 16 extends in a width direction of the vehicle 10 body. Each of the legs 18 are disposed toward opposing edges of the airfoil 16, with a top end of each of the legs 18 being attached to a bottom of the airfoil 16, and the bottom end of each of the legs 18 being attached to the top of the vehicle rear end 12.

A fixed spoiler solves the problem of excess lift forces acting on the vehicle 10. As air flows over the top and rear end 12 of the vehicle 10, the spoiler 14 deflects a portion of the air flow, causing the deflected air flow to travel in an upward direction. This effect thereby disrupts the local flow field, thereby reducing the lift acting on the vehicle 10. Thus, the stability performance of the vehicle 10 at high speeds is improved.

However, problems exist with the conventional fixed spoiler. Initially, fixed spoilers increase the size of the rear base drag, also known as the wake bubble, behind the vehicle. While this is useful to counteract excess lift forces at high speeds, the increased size of the wake bubble is a major cause of drag on the vehicle. Thus, while effective and useful at higher speeds, the fixed spoiler impairs the performance of the vehicle at lower speeds. Further, a spoiler on the rear end of a vehicle may detract from the aesthetic appearance of the vehicle exterior.

Figure 2A:
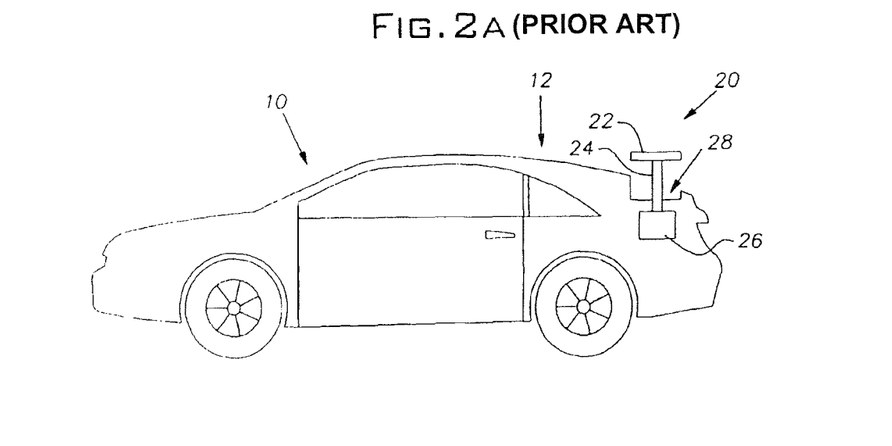
FIG. 2A illustrates a side view of a deployable spoiler of the prior art in a deployed position.
Figure 2B:
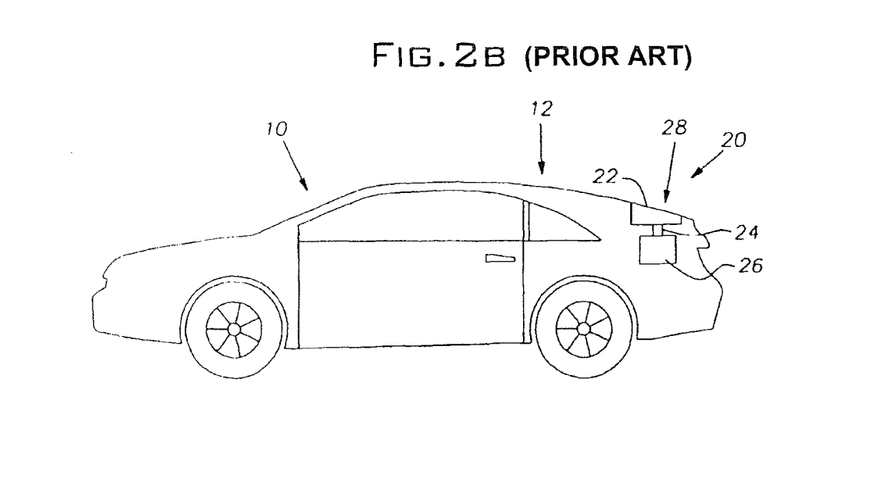
FIG. 2B illustrates a top view of the deployable spoiler of the prior art in a retracted position.

To counteract the problems associated with conventional fixed spoilers, a deployable/retractable spoiler 20 (hereinafter, "deployable spoiler 20") has been adopted. With reference to FIGS. 2A and 2B, the deployable spoiler 20 is shown disposed on a vehicle rear end 12, in the same general position as the fixed spoiler 14 shown in FIGS. 1A and 1B. The deployable spoiler 20 includes an airfoil 22, two legs 24, and a motor 26. The airfoil 22 is connected to the vehicle rear end 12 and the motor 26 through the two legs 24. The legs 24 are mounted on opposing sides of a bottom surface of the airfoil 22. Each of the legs 24, along bottom portions, also engage the motor 26. Through this engagement, the motor 26 can raise and lower the legs 24, thereby raising and lowering the airfoil 22. Further, the motor 26 is connected to a controller (not shown) that controls the operation of the motor 26. FIG. 2A shows the deployable spoiler 20 in a deployed condition, where the motor 26 has elevated the airfoil 22. FIG. 2B shows the deployable spoiler 20 in a retracted condition, where the motor 26 has lowered the airfoil 22.

With further reference to FIG. 2B, it is noted that when the airfoil 22 is lowered, it is shaped so as to fit within an indentation 28 formed in the rear end 12 of the vehicle 10. The vehicle rear end 12, the indentation 28, and the airfoil 22 are shaped so that when the airfoil 22 is in the retracted position, as shown in FIG. 2B, a top surface of the airfoil 22 is flush with the vehicle rear end 12. Accordingly, the vehicle rear end 12 does not appear to have a spoiler disposed thereon or therein.

In operation, the controller directs the motor 26 to either deploy or retract the airfoil 22 according to a detected speed of the vehicle 10. When the vehicle 10 is stopped or moving at lower speeds, the deployable spoiler 20 is held in the retracted, lowered position shown in FIG. 2B. When the vehicle 10 achieves higher speeds, the controller signals the motor 26 to deploy the airfoil 22. By only deploying the spoiler 20 when excess lift forces are acting on the vehicle 10, the wake bubble is not increased through the presence of a spoiler at lower speeds. Therefore, the problem of the spoiler interfering with the air flow around the vehicle at lower speeds is solved. Further, since the spoiler only deploys at higher speeds, and the spoiler is held within the indentation 28 of the vehicle rear end 12 at all other times, the aesthetic of the vehicle 10 is not altered by the spoiler while the vehicle is stopped or is travelling at lower speeds.

While the deployable spoiler addresses the problems associated with the fixed spoiler, new problems are presented by the deployable spoiler. Initially, the deployable spoiler requires several moving parts. As the number of moving parts increases, the likelihood of a failure increases. Further, the introduction of the motor and other additional parts increases the weight of the deployable spoiler relative to the fixed spoiler. Thus, some of the efficiency gains achieved by retracting the spoiler during travel at low speeds are negated by the increased vehicle weight. Finally, the cost of the deployable spoiler, due to the increase in design complexity, is greater than the cost of a fixed spoiler.

For these reasons, there exists a need for an apparatus and method to counteract the destabilizing effects of lift on a vehicle traveling at high speeds, while eliminating the problems associated with the conventional fixed and deployable spoilers.

SUMMARY OF THE INVENTION

The present invention counteracts the negative effects of lift on a vehicle traveling at a high rate of speed, while also remedying the problems associated with conventional fixed spoilers and deployable spoilers. The present invention remedies the problems associated with conventional spoilers by providing a plasma spoiler in a rear portion of a vehicle.

The plasma spoiler is mounted on a rear portion of a vehicle so as to be flush with a top surface of the rear portion. The plasma spoiler applies a force on an air flowing over the rear end portion of the vehicle, the force being in a direction away from the vehicle. The plasma spoiler is formed of a first and second electrode asymmetrically mounted on opposing surfaces of a dielectric substrate. The first electrode is completely insulated by the dielectric substrate while the second electrode is exposed to the air. Further, the second electrode is disposed in a longitudinal position that is relatively nearer the rear of the vehicle in relation to the first electrode. Finally, the electrodes are connected to a power source for supplying a voltage to the electrodes.

A controller selectively connects and disconnects the first and second electrodes with the power source. Further, the operation of the controller can be improved by connecting the controller to a vehicle speed sensor.

Further, a controller-actuated switch can be disposed between the power source and one of the first and second electrodes. The switch, when in a closed position, connects the electrodes with the power source. When in an open position, the electrodes and the power source are not connected.

BRIEF DESCRIPTION OF THE DRAWINGS

These and further features of the present invention will be apparent with reference to the following description and drawings.

DETAILED DESCRIPTION OF THE INVENTION

The invention will now be described in accordance with its preferred embodiments. The description with reference to the figures is intended to simplify the explanation of the invention and is not meant to limit the scope of the invention.

Figure 3A:
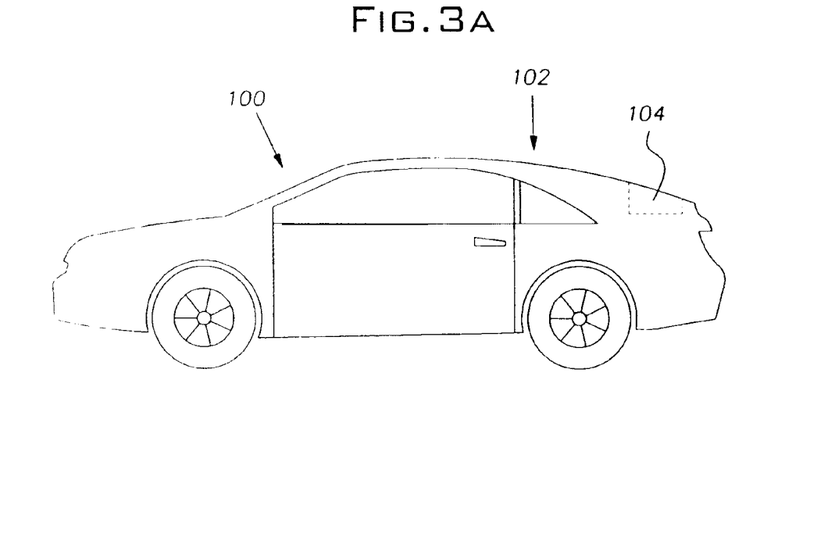
FIG. 3A illustrates a side view of a vehicle equipped with a plasma spoiler of the present invention.
Figure 3B:
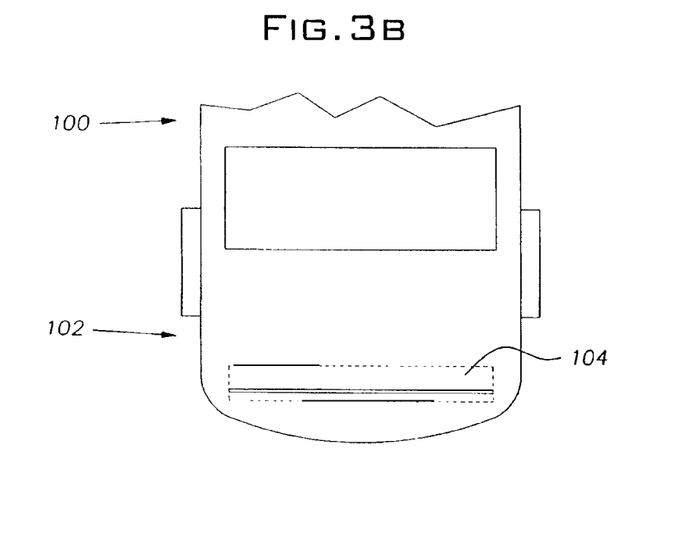
FIG. 3B illustrates a top view of the vehicle equipped with the plasma spoiler of the present invention.

With reference to FIGS. 3A and 3B, a vehicle 100 having a plasma spoiler 104 according to the present invention is shown. The vehicle 100 of the exemplary embodiment is a high performance automobile. The vehicle 100 has a front portion where the hood is disposed, a passenger portion immediately behind the front portion, and a rear end 102 immediately behind the passenger portion. The rear end 102 typically includes a hinged door opening to a vehicle trunk or storage space. The rear end 102 has a top surface that is generally horizontal and tapers into a vertical surface defining the back side of the vehicle 100.

The plasma spoiler 104 shown in the vehicle rear end 102 is mounted so as to be flush with a top surface of the vehicle rear end 102, and is generally disposed at a location on the top, generally horizontal surface of the rear end 102 immediately adjacent to the tapered vertical surface of the rear end 102. The plasma spoiler 104 has a portion that is exposed to the open air, but otherwise is mounted so as to either not protrude (see FIG. 4D) or minimally protrude (see FIGS. 4A and 4B) from the top surface of the vehicle rear end 102. By mounting the plasma spoiler 104 flush with the vehicle rear end 102, the rear end 102 does not appear to have a spoiler, thus the aesthetic appearance of the vehicle can be preserved. Further, since the plasma spoiler 104 at most minimally protrudes beyond the shape of the vehicle rear end 102, the aerodynamic characteristics of the vehicle 100 are not affected by the physical structure of the plasma spoiler 104.

With reference to FIGS. 4A-4D, the plasma spoiler 104 is shown in detail. The plasma spoiler includes a dielectric substrate 106, a first or lower electrode 108, a second or upper electrode 110, an A/C voltage source 112 (hereinafter "power source 112"), a switch 114, and a controller 120.

Figure 4A:
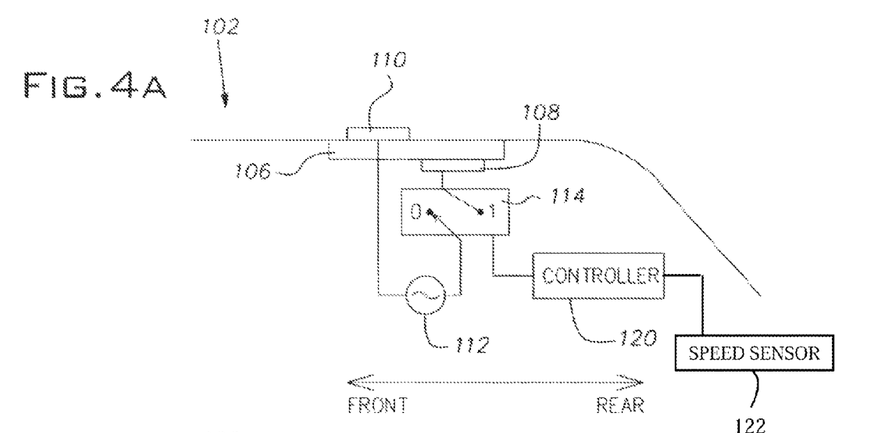
FIG. 4A is a schematic side view illustrating the plasma spoiler of the present invention in a deactivated condition.
Figure 4B:
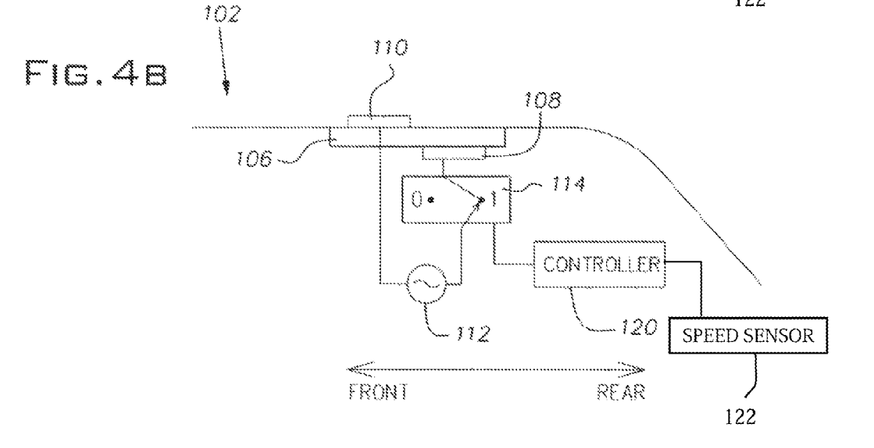
FIG. 4B is a schematic side view illustrating the plasma spoiler of the present invention in an activated condition.
Figure 4C:
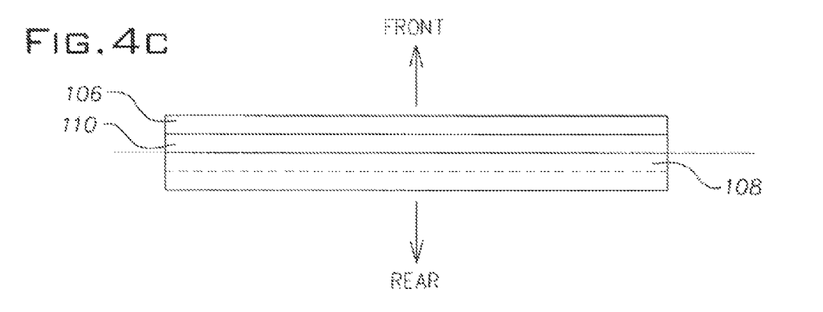
FIG. 4C is a top view of the plasma spoiler of the present invention.
Figure 4D:
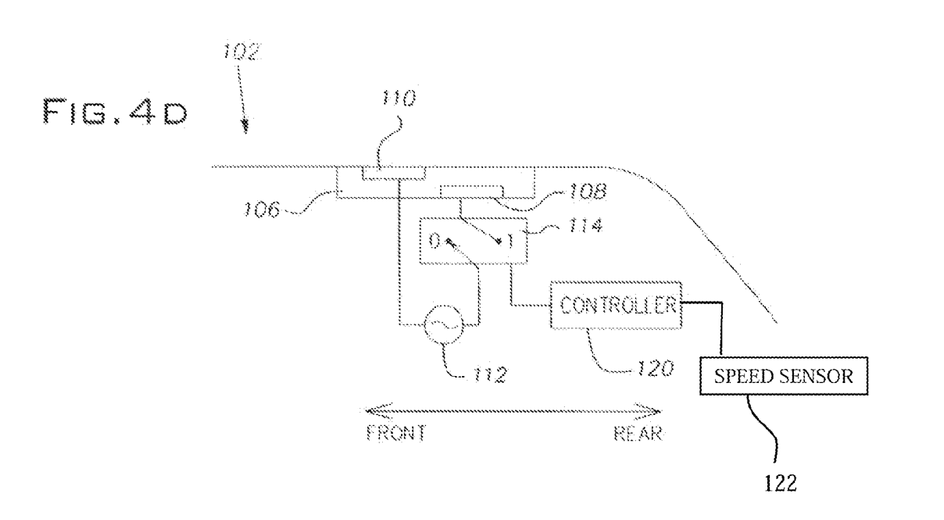
FIG. 4D is a schematic side view illustrating an alternate embodiment of the plasma spoiler of the present invention in an activated condition.

The plasma spoiler 104 is received in a space 124 formed in the vehicle rear end 102. The space 124 is formed in a shape that is the negative of the plasma spoiler 104. So as to provide mounting space for an adequately sized plasma spoiler 104, the indentation 124 substantially extends the entire width of the vehicle rear end 102. Further, the length of the indentation is sufficient to allow space for the components of the plasma spoiler 104, as will be described in further detail below. Similarly, the depth of the indentation 124 substantially corresponds to the height of the plasma spoiler 104. Therefore, when the plasma spoiler 104 is mounted within the indentation 124, a top surface of the plasma spoiler 104 is generally flush with a top surface of the vehicle rear end 102. In FIGS. 4A and 4B, the second electrode 110 of the plasma spoiler 104 protrudes slightly from the top surface of the vehicle rear end 102. As is explained below, the protrusion of the second electrode 110 is minimal and can therefore generally be disregarded. In FIG. 4D, the second electrode 110 is mounted within the dielectric substrate 106, with only a top surface of the second electrode 110 exposed to the air. Thus, in FIG. 4D, the plasma spoiler 104 is completely flush with the top surface of the vehicle rear end 102.

By minimizing or eliminating the protrusion of the plasma spoiler 104 from the vehicle rear end 102, the plasma spoiler 104 does not effect the air flow over the rear end 102 through interaction with the physical structure of the plasma spoiler 104. Further, the aesthetic appearance of the vehicle 100 is improved by eliminating the appearance of a spoiler. To further provide the appearance of a seamless assembly, the top surface of the plasma spoiler 104 can be painted the same color as the vehicle rear end 102.

The bulk of the body of the plasma spoiler 104 is formed from the dielectric substrate 106. The dielectric substrate 106 has width and length dimensions sized so as to substantially fill the indentation 124. Although the dielectric substrate 106 may be formed of any dielectric material suitable for the application, the dielectric substrate 106 is preferably formed of a Kapton film. As illustrated in FIGS. 4A, 4B, and 4D, the dielectric substrate 106 is mounted in the rear end 102 of the vehicle 100 so as to be generally flush with the top surface of the rear end 102. By mounting the dielectric substrate 106 so as to be generally flush with the vehicle rear end 102, the physical structure of the dielectric substrate 106 does not interfere with the air flow patterns around the vehicle rear end 102. Further, the aesthetic appearance of the vehicle 100 is not effected.

The two electrodes 108, 110 are formed of any suitable conductive material. The electrodes 108, 110 are mounted on opposing sides of the dielectric substrate 106 so as to be separated from one another by the dielectric substrate 106, and extend nearly the entire length of the dielectric substrate. The first electrode 108 is mounted on an underside of the dielectric substrate 106, and is thereby fully insulated from the outside air by the dielectric substrate 106. As shown in FIGS. 4A and 4B, the first electrode 108 is mounted on the bottom surface of the dielectric substrate 106. FIG. 4D illustrates an embodiment wherein the first electrode 108 is encapsulated within the dielectric substrate 106.

The second electrode 110 is mounted on a top side of the dielectric substrate 106 so as to be exposed to the air. As shown in FIGS. 4A and 4B, the second electrode 110 protrudes slightly from the top surface of the vehicle rear end 102. The electrodes 108, 110 have a thickness typically less than 1 mm, which results in the protrusion of the second electrode 110 being minimal.

However, even such a minimal protrusion of the second electrode 110 can be prevented by mounting the second electrode 110 within the dielectric substrate 106, as shown in FIG. 4D. As illustrated, the second electrode 110 is mounted within the dielectric substrate 106 so that a top surface of the second electrode 110 is flush with the top surface of the dielectric substrate 106 and is exposed to the open air. While the protrusion of the second electrode 110 in the embodiment illustrated in FIGS. 4A and 4B is minimal, the embodiment of FIG. 4D is an improvement thereon.

Turning to the relative positioning of the electrodes 108, 110, the second electrode 110 is mounted relatively closer to the front of the vehicle 100 as compared to the first electrode 108. For the plasma spoiler 104 to properly function, the second electrode 110 and the first electrode 108 should not overlap. The precise amount of gap varies depending on the types of material chosen and the specific application, however the gap size can be experimentally determined. The illustrated placement is merely exemplary, as the electrodes 108, 110 can be mounted so as to have a gap between one another.

As mentioned above, the present invention reduces the protrusion of the spoiler 104 components from the rear end 102 of the vehicle 100. In this regard, it is again noted that the second electrode 110, as shown in FIG. 4A, protrudes beyond the surface of the rear end 102 of the vehicle 100. This protrusion is considered minimal and has a negligible effect on the air flow over the vehicle rear end 102. The negligible effect is a result of the thickness of the electrodes 108, 110, which is typically less than 1 mm. Accordingly, given the shape of the vehicle and the relative volume of air flowing over the vehicle rear end 102, the protrusion of the second electrode 110 yields a negligible effect on the air flow patterns around the vehicle 100. Further, the aesthetic appearance of the vehicle rear end 102 is not altered in any way, as the minimal protrusion of the second electrode 110 is not readily visible at a glance. However, as shown in FIG. 4D, the invention is amenable to embodiments wherein the plasma spoiler 104 is mounted so that the second electrode 110, while still exposed to the air, is nevertheless flush with the vehicle rear end 102 surface. Such an embodiment is preferable to that shown in FIGS. 4A and 4B. However, the embodiment of 4D may be more expensive to manufacture. Thus, allowing for a minimal protrusion of the second electrode 110 provides a cost-effective alternative that does not hinder the quality of the apparatus significantly.

The power source 112 is mounted within the vehicle rear end 102 and serves the function of providing power to the two electrodes 108, 110 so as to power the plasma spoiler 104. The power source 112 is directly electrically connected to the second electrode 110. The power source 112 is electrically connected to the first electrode 108 through the switch 114. The switch 114 allows for selectively activating and deactivating the plasma spoiler 104, as will be described in further detail below. The voltage supplied by the power source 112 is sufficient to generate a required force on the air flow. While the generation of the force will be described in detail below, it is noted that the voltage for generating the repellant force is generally in the range of tens of thousands of volts. Further, it is noted that the switch 114 can be disposed between the power source 112 and either of the electrodes 108, 110.

The present embodiment of the plasma spoiler 104 will be described as utilizing a standard ON/OFF switch. However, the present invention is amenable to a variable switch allowing for gradually increasing and decreasing of the supplied A/C voltage. A variable switch allows the affects of the spoiler to be imparted incrementally, allowing for continuous variation of the air flow deflection by the plasma spoiler 104 as the vehicle speed changes.

The switch 114 is also connected to the controller 120. Through this connection, the controller 120 actuates the switch 114 to either connect or disconnect the power source 112 to the first electrode 108. The controller 120 places the switch 114 in a position marked 1 (hereinafter, "on position") to connect the first electrode 108 to the power source 112. The controller 120 can also place the switch 114 in a position marked 0 (hereinafter, "off position"), to disconnect the power source 112 from the first electrode 108. In this way, the controller 120 determines when the plasma spoiler 104 is activated and deactivated.

The determination of whether the plasma spoiler 104 is to be activated or deactivated is made on the basis of several variables. Most importantly, the actuation of the plasma spoiler 104 is made based upon the vehicle speed. As mentioned above, the effect of a spoiler is not desirable at lower vehicle speeds. Rather, the spoiling effect is only desirable at higher vehicle speeds. The exact speed at which the plasma spoiler 104 will be activated by the controller 120 varies depending on other design features of the vehicle 100, and can be experimentally determined. Generally, the controller 120 will turn the switch 114 to the on position when the vehicle 100 attains a trigger speed and continues to travel at a speed at least equal to the trigger speed. The trigger speed is generally in the range of 50-70 miles per hour.

The controller 120 is connected, directly or indirectly, to a speed sensor 122. In this way, the controller 120 can monitor the vehicle speed so as to actuate the switch 114 between the off and on positions in response to vehicle speed being below or above the trigger speed. When vehicle speed moves above the trigger speed, the controller actuates the switch 100 from the off position to the on position, so as to activate the plasma spoiler 104. When the speed drops below the trigger speed, the controller 120 actuates the switch 100 from the on position to the off position, thereby deactivating the plasma spoiler 104.

Figure 5A:
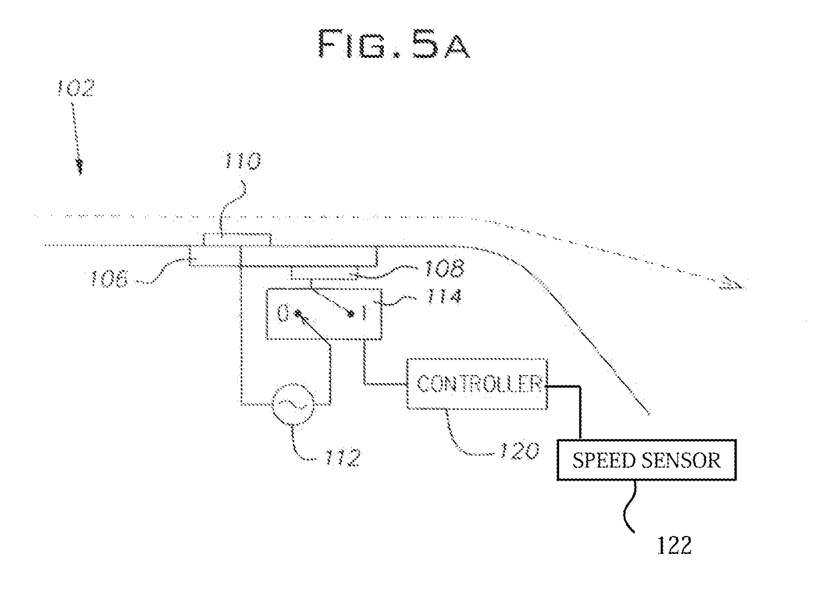
FIG. 5A illustrates the air flow patterns around a vehicle rear end when the plasma spoiler is deactivated.
Figure 5B:
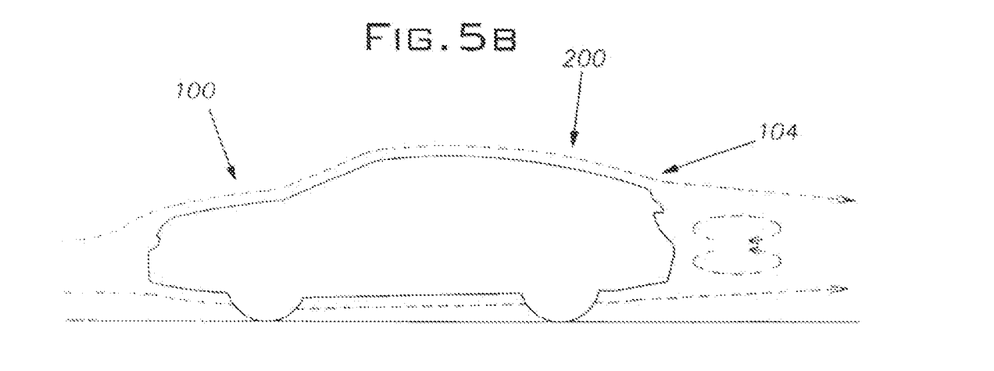
FIG. 5B illustrates the air flow patterns around a vehicle equipped with the plasma spoiler of the present invention when the plasma spoiler is deactivated.

With reference to FIGS. 5A, 5B, 6A, and 6B, operation of the plasma spoiler 104 is schematically illustrated. FIG. 5A shows the air flow pattern (represented by the dotted line) over the vehicle rear end 102 when the plasma spoiler 104 is deactivated. FIG. 5B shows the air flow pattern over the vehicle 100 when the plasma spoiler 104 is deactivated.

With particular reference to the air flow pattern above the vehicle 100, FIGS. 5A and 5B show that the air flows at a slight downward angle from the top of the vehicle 100 after passing the vehicle rear end 102. As a result, due to the general curved shape of the airflow above the vehicle 100, lift is created. This lift force is dependent on speed. Therefore, at high speeds, an excessive lift force is created that acts on the vehicle 100, thereby reducing vehicle stability and resulting in reduced responsiveness to operator instructions. To counteract the lift force, the controller 120 senses that the vehicle speed is at or above the trigger speed, and activates the plasma spoiler 104.

Figure 6A:
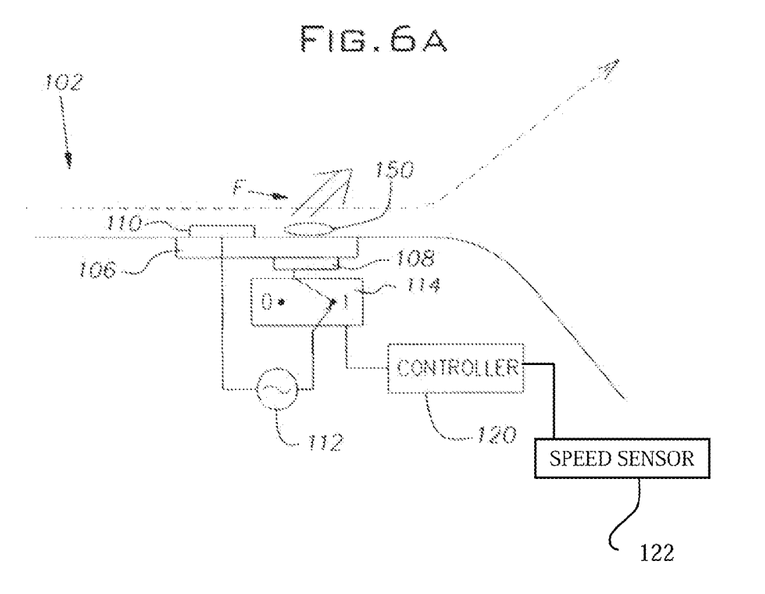
FIG. 6A illustrates the air flow patterns around a vehicle rear end when the plasma spoiler is activated.
Figure 6B:
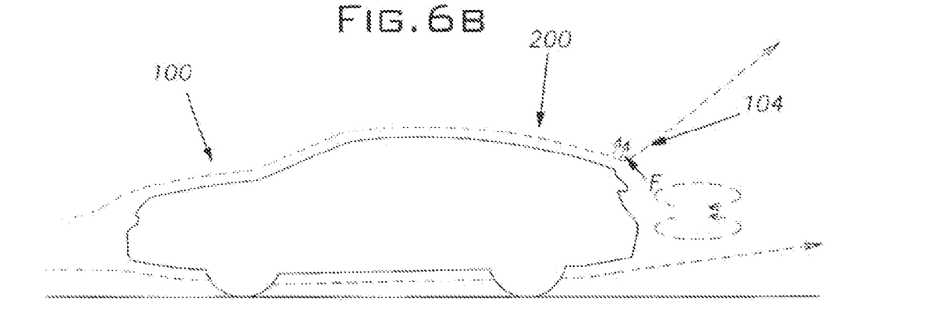
FIG. 6B illustrates the air flow patterns around a vehicle equipped with the plasma spoiler of the present invention when the plasma spoiler is activated.

FIGS. 6A and 6B illustrate the air flow patterns around the vehicle 100 when the plasma spoiler 104 is activated. As previously mentioned, when the vehicle 100 exceeds the trigger speed, the controller 120 actuates the switch 114 to the on position, closing the circuit and allowing the power source 112 to direct an A/C voltage to the first electrode 108 and the second electrode 110. The A/C voltage is sufficient to induce ionization of the air behind the second electrode 110 and above the first electrode 108. The ionized air is referred to as plasma, and is represented by a plasma region 150 in FIG. 6A. The plasma region 150, as a result of the ionization of the air, exerts a force F (represented by arrows in FIGS. 6A and 6B) effectively deflecting the local flow field in a direction away from the vehicle 100. The force F exerted by the plasma region 150 is a result of a dielectric barrier discharge.

Thus, when the air flows over the vehicle rear end 102, and flows specifically over the plasma spoiler 104, the plasma region 150 acts on and deflects the air flow. Particularly, the arrangement of the first electrode 108 and the second electrode 110 in the dielectric substrate 106 causes the plasma region 150 to exert a force F on the ambient air in a direction up and away from the vehicle rear end 102. The force F causes the air flow to deflect away from the body of the vehicle 100 as the air flows past the plasma spoiler 104. This effect mirrors that of a conventional, physical spoiler mounted to deflect the air flow (as shown in FIGS. 1 and 2). As shown by the air flow pattern behind the vehicle 100, the air flow does not travel at a downward angle, as is the case when the plasma spoiler 104 is deactivated (as in FIGS. 5A and 5B). Accordingly, the deflection of the air flow reduces the effective curvature of the flow field above the vehicle 100. Consequently, the lift forces acting on the vehicle 100 at high speeds are reduced, thus improving the responsiveness of the vehicle 100 to operator controls.

With further reference to FIGS. 5A, 5B, 6A, and 6B, it is noted that, like the deployable spoiler 20, the plasma spoiler 104 of the present invention can be turned off so as to prevent excess drag from acting on the vehicle 100 at lower speeds. Through this operation, the plasma spoiler 104 provides all of the benefits of conventional spoilers, while eliminating the drawbacks typically associated therewith.

The present invention has been described according to a preferred embodiment. The preferred embodiment is merely illustrative of the invention, and is not meant to limit the scope of the invention. It is considered apparent that one skilled in the art would recognize that the present invention is amenable to various modifications and alterations. All such modifications and alterations are considered to be within the scope of the invention.

One such alteration is to embed the plasma spoiler within a conventional, fixed spoiler (as illustrated in FIGS. 1A and 1B). This embodiment would allow for a reduction in the incline and surface area of the fixed spoiler. Therefore, a smaller, fixed spoiler can be mounted for operation at lower and mid-range speeds, and can actuate the plasma spoiler at higher speeds. Such a structure would allow for the mounting of a spoiler to provide a desired vehicle aesthetic appearance, while allowing for a reduction in spoiler size without reducing the operability of the spoiler.

What is claimed is:

1. A plasma spoiler mounted on a rear portion of a vehicle, comprising:
   a dielectric substrate formed of a dielectric material;
   a first electrode mounted on the dielectric substrate so as to be insulated from outside air;
   a second electrode mounted on the dielectric substrate so as to be exposed to outside air and disposed in a longitudinal position toward a front of the vehicle relative to the first electrode;
   a power source connected to the first and second electrodes, the power source supplying a voltage to the electrodes;
   a switch disposed between at least one of a connection between the power source and the first electrode and the power source and the second electrode; and
   a controller connected to the switch and a vehicle speed sensor,
   wherein said switch is selectively operable in an on position and an off position, wherein when said switch is in the on position, the voltage passes from the power source to the electrodes, and when the switch is in the off position, the voltage does not pass from the power source to the electrodes,
   the controller actuates the switch to the on position when a vehicle speed exceeds a trigger speed, and actuates the switch to the off position when the vehicle speed is below the trigger speed, and
   the on position of the switch allows a variable amount of voltage to pass to the electrodes, and wherein the controller actuates the switch to increase the amount of voltage passing through the switch to the electrodes as the speed increases over the trigger speed.

2. The plasma spoiler according to claim 1, wherein the dielectric substrate is a Kapton film.

3. The plasma spoiler according to claim 1, wherein the plasma spoiler has a length dimension substantially equal to a width of the rear portion of the vehicle.

4. The plasma spoiler according to claim 1, wherein the second electrode comprises a top surface, a bottom surface, and two side surfaces, and
   the second electrode is mounted on the dielectric substrate so that the bottom surface and the two side surfaces are insulated by the dielectric substrate, and said top surface is flush with a top surface of the dielectric substrate.

5. A vehicle, comprising:
   a body having a front portion and a rear end, said rear end having a substantially planar surface which tapers into a vertical surface defining a back side of the vehicle, said substantially planar surface of the rear end having a space defined therein adjacent the vertical surface defining the back side of the vehicle;
   a plasma spoiler received in the space defined in the rear end such that a top surface of the plasma spoiler is level with a top surface of the rear end surrounding the space defined in the rear end;
   a switch provided between a power source and the plasma spoiler; and
   a controller connected to and controlling the switch,
   wherein the controller is configured to actuate the switch to an on position where the power source is connected to the plasma spoiler when a sensed vehicle speed sensed by a speed sensor is greater than a trigger speed, and the controller actuates the switch to an off position where the power source is disconnected from the plasma spoiler when the sensed vehicle speed is less than the trigger speed, and the plasma spoiler is configured to deflect an airflow passing over the rear end of the vehicle in an upward direction away from the vehicle body when connected to the power source.

6. The vehicle according to claim 5, wherein the plasma spoiler comprises:
   a dielectric substrate formed of a dielectric material;
   a first electrode mounted on a bottom surface of the dielectric substrate and insulated by the dielectric substrate;
   a second electrode mounted on a top surface of the dielectric substrate and exposed to outside air; and
   the power source connected to the first and second electrodes, the power source supplying a voltage to the electrodes,
   wherein the first and second electrodes are mounted with the first electrode disposed in a longitudinal position toward the rear of the vehicle relative to the second electrode.

7. A method for altering a vehicle aerodynamic profile based upon a sensed vehicle speed, comprising the steps of:
   detecting the sensed vehicle speed exceeding a predetermined trigger speed;
   actuating a switch to an on position, wherein a voltage is allowed to pass from a power source to two electrodes mounted in a plasma spoiler;
   generating a plasma region that exerts a force acting in a direction away from the vehicle;
   detecting an increase in the sensed vehicle speed; and
   increasing the voltage allowed to pass from the power source to the two electrodes mounted in the plasma spoiler so as to increase the force acting in a direction away from the vehicle.

8. The method for altering a vehicle aerodynamic profile according to claim 7, further comprising the steps of:
   detecting a decrease in the sensed vehicle speed;
   decreasing the voltage allowed to pass from the power source to the two electrodes as the sensed vehicle speed decreases and is greater than the predetermined trigger speed; and
   actuating the switch to an off position, wherein the voltage is not allowed to pass from the power source to the two electrodes in the plasma spoiler when the sensed vehicle speed drops below the predetermined trigger speed.

9. The method for altering a vehicle aerodynamic profile according to claim 7, further comprising the steps of:
   providing a dielectric substrate;
   providing a first electrode mounted on the dielectric substrate so as to be insulated from outside air by the dielectric substrate;
   providing a second electrode mounted on the dielectric substrate so as to be exposed to the outside air, wherein the first electrode is mounted relatively nearer a rear end of the vehicle than the second electrode.

10. A vehicle, comprising:
    a body having a rear end with a substantially planar horizontal surface which tapers into a vertical surface defining a back side of the vehicle;
    a plasma spoiler provided directly on the substantially planar horizontal surface of the body rear end;
    a switch provided between a power source and the plasma spoiler;
    a controller connected to and controlling the switch; and
    a speed sensor for sensing a vehicle speed,
    wherein the controller is configured to actuate the switch to an on position where the power source is connected to the plasma spoiler when the sensed vehicle speed is greater than a trigger speed, and the controller actuates the switch to an off position where the power source is disconnected from the plasma spoiler when the sensed vehicle speed is less than the trigger speed, and said plasma spoiler is configured to generate a plasma region exerting a force in a substantially upward direction away from the substantially planar horizontal surface of the body rear portion when connected to the power source.

11. The vehicle according to claim 10, wherein the plasma spoiler comprises:
    a dielectric substrate formed of a dielectric material;
    a first electrode mounted on a bottom surface of the dielectric substrate and insulated by the dielectric substrate; and
    a second electrode mounted on a top surface of the dielectric substrate and exposed to outside air,
    wherein the power source is selectively connected to the first and second electrodes to supply a voltage to the electrodes, and the first and second electrodes are mounted with the first electrode disposed in a longitudinal position toward the rear of the vehicle relative to the second electrode.

12. The vehicle according to claim 11, wherein the power source is connected to both first and second electrodes when the switch is in the on position, and the power source is disconnected from the at least one of the first and second electrodes when the switch is in the off position.

13. The vehicle according to claim 10, wherein the controller is configured to control an amount of voltage supplied by the power source to the plasma spoiler such that the supplied voltage is increased as a vehicle speed increases and the supplied voltage is decreased as the vehicle speed decreases.

14. The plasma spoiler according to claim 1, wherein a rear edge of the second electrode is disposed in a longitudinal position toward the front of the vehicle relative to a front edge of the first electrode.

15. The plasma spoiler according to claim 6, wherein a rear edge of the second electrode is disposed in a longitudinal position toward a front of the vehicle relative to a front edge of the first electrode.

16. The plasma spoiler according to claim 11, wherein a rear edge of the second electrode is disposed in a longitudinal position toward a front of the vehicle relative to a front edge of the first electrode.

17. The plasma spoiler according to claim 1, wherein the trigger speed is set at a lower limit for high speed vehicle travel.

18. The plasma spoiler according to claim 1, wherein the trigger speed is set at approximately 50 miles per hour.

19. The vehicle according to claim 5, wherein the trigger speed is set at approximately 50 miles per hour.

20. The method for altering a vehicle aerodynamic profile according to claim 7, wherein the trigger speed is set at approximately 50 miles per hour.

21. The vehicle according to claim 10, wherein the trigger speed is set at approximately 50 miles per hour.

22. The vehicle according to claim 5, wherein the controller is further configured to increase an amount of voltage supplied to the plasma spoiler as the sensed vehicle speed increases and to decrease the amount of voltage supplied to the plasma spoiler as the sensed vehicle speed decreases.

23. The vehicle according to claim 10, wherein the controller is further configured to increase an amount of voltage supplied to the plasma spoiler as the sensed vehicle speed increases and to decrease the amount of voltage supplied to the plasma spoiler as the sensed vehicle speed decreases.

24. A control system for a plasma spoiler configured to be mounted on a rear portion of a ground vehicle, the control system comprising:
- a speed sensor configured to sense a vehicle speed; and
- a controller in communication with the speed sensor and configured to increase the amplitude of voltage supplied to the plasma spoiler from an associated power source as the sensed vehicle speed increases and to decrease the amplitude of voltage supplied to the plasma spoiler from an associated power source as the sensed vehicle speed decreases.

* * * * *